(12) United States Patent
Miller

(10) Patent No.: US 9,127,579 B2
(45) Date of Patent: Sep. 8, 2015

(54) FLUID MANAGEMENT SYSTEM

(76) Inventor: Timothy E. Miller, Wauseon, OH (US)

(*) Notice: Subject to any disclaimer, the term of this patent is extended or adjusted under 35 U.S.C. 154(b) by 562 days.

(21) Appl. No.: 13/571,935

(22) Filed: Aug. 10, 2012

(65) Prior Publication Data
US 2013/0048088 A1 Feb. 28, 2013

Related U.S. Application Data

(60) Provisional application No. 61/528,786, filed on Aug. 30, 2011.

(51) Int. Cl.
F16K 24/00 (2006.01)
F01M 11/04 (2006.01)
F16H 57/04 (2010.01)

(52) U.S. Cl.
CPC ... *F01M 11/0458* (2013.01); *F01M 2011/0483* (2013.01); *F16H 57/0408* (2013.01); *F16K 24/00* (2013.01); *Y10T 137/0318* (2015.04); *Y10T 137/6855* (2015.04)

(58) Field of Classification Search
CPC .................. F01M 11/0458; F01M 2011/0483; F16H 57/0408; F16K 24/00
USPC ................ 137/565.01, 565.17, 571, 590, 592
See application file for complete search history.

(56) References Cited

U.S. PATENT DOCUMENTS

| | | | |
|---|---|---|---|
| 1,640,404 A * | 8/1927 | Hansen | 137/798 |
| 2,320,048 A * | 5/1943 | Parson | 184/1.5 |
| 3,447,636 A | 6/1969 | Bonfilio | |
| 3,720,287 A * | 3/1973 | Martel | 184/1.5 |
| 4,095,673 A | 6/1978 | Takeuchi | |
| 4,756,411 A | 7/1988 | Garland | |
| 5,002,154 A * | 3/1991 | Chen | 184/1.5 |
| 5,092,429 A | 3/1992 | Linares et al. | |
| 5,094,201 A * | 3/1992 | Bedi | 184/1.5 |
| 5,291,968 A * | 3/1994 | Brown | 184/1.5 |
| 5,370,160 A * | 12/1994 | Parker | 184/1.5 |
| 5,372,219 A * | 12/1994 | Peralta | 184/1.5 |
| 5,487,447 A | 1/1996 | Martinez Velazquez | |
| 5,554,278 A * | 9/1996 | Henderson | 210/136 |
| 5,682,851 A | 11/1997 | Breen et al. | |
| 5,787,372 A | 7/1998 | Edwards et al. | |
| 6,098,752 A | 8/2000 | McCaleb | |
| 6,286,626 B1 | 9/2001 | Evans | |
| 6,435,307 B2 | 8/2002 | Selby | |
| 6,508,280 B2 | 1/2003 | Capstran | |
| 6,510,830 B2 | 1/2003 | Rossiter | |
| 6,886,664 B2 | 5/2005 | Erwin et al. | |
| 6,889,724 B2 * | 5/2005 | Awad | 141/65 |
| 6,959,740 B2 | 11/2005 | Few | |
| 7,051,697 B2 | 5/2006 | Waelput | |
| 7,207,417 B2 | 4/2007 | Blount | |
| 7,926,617 B2 | 4/2011 | Lockwood et al. | |

(Continued)

*Primary Examiner* — Marina Tietjen
*Assistant Examiner* — Umashankar Venkatesan
(74) *Attorney, Agent, or Firm* — Fraser Clemens Martin & Miller LLC; Jacob M. Ward

(57) ABSTRACT

A fluid management system and a method for managing fluid include a removable cartridge, a fluid reservoir, a fluid exchange pump, and a conduit. The conduit provides fluid communication between the removable cartridge and the fluid reservoir. The fluid exchange pump transfers a first fluid from the fluid reservoir to the removable cartridge in a first direction, and permits a flow of a second fluid from the removable cartridge to the fluid reservoir in a second direction.

17 Claims, 5 Drawing Sheets

(56) References Cited

U.S. PATENT DOCUMENTS

| | | |
|---|---|---|
| 8,069,884 B1* | 12/2011 | Gray-Woods ............ 141/95 |
| 2001/0047907 A1* | 12/2001 | Viken ............ 184/1.5 |
| 2004/0211626 A1* | 10/2004 | Waelput ............ 184/1.5 |
| 2005/0098226 A1* | 5/2005 | Rounds et al. ............ 141/65 |
| 2005/0166993 A1* | 8/2005 | Viken et al. ............ 141/98 |
| 2007/0119515 A1 | 5/2007 | Phillips et al. |
| 2009/0283363 A1* | 11/2009 | Lockwood et al. ............ 184/1.5 |
| 2011/0194953 A1* | 8/2011 | Schalk et al. ............ 417/313 |

* cited by examiner

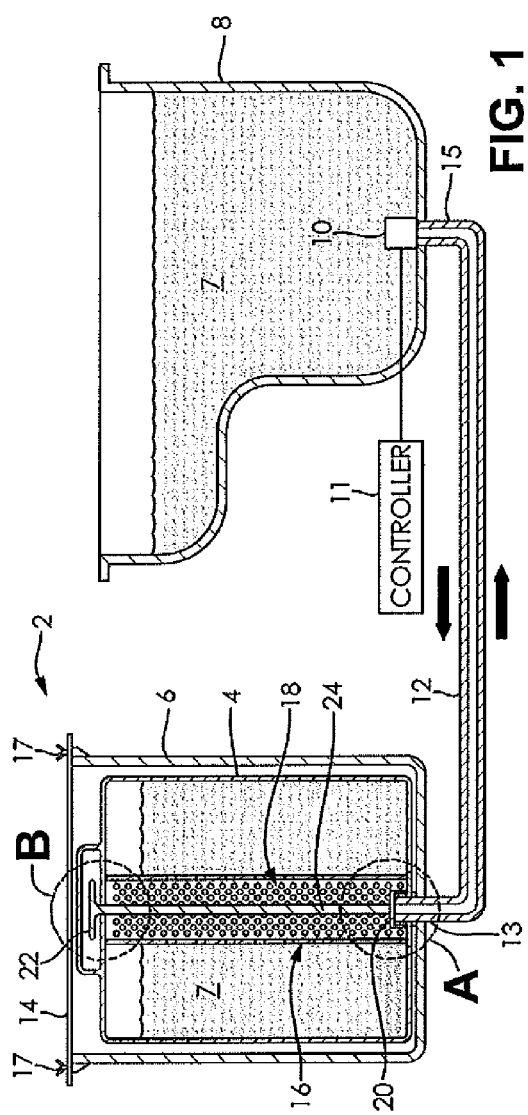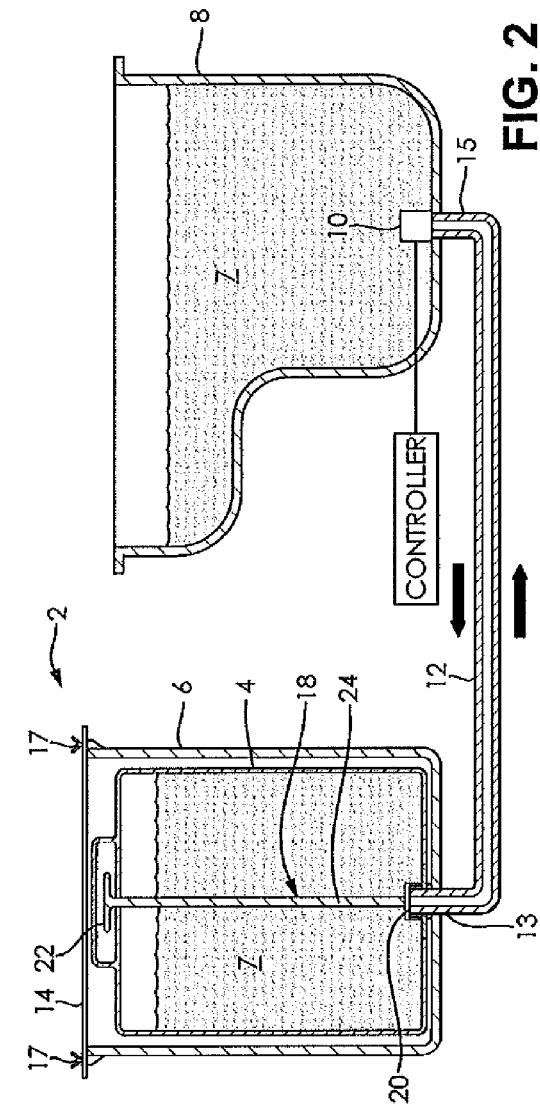

FLUID MANAGEMENT SYSTEM

CROSS-REFERENCE TO RELATED APPLICATIONS

This application claims the benefit of U.S. Provisional Application No. 61/528,786, filed on Aug. 30, 2011. The entire disclosure of the above application is hereby incorporated herein by reference.

FIELD OF THE INVENTION

The present disclosure relates to a fluid management system and, more particularly, to a fluid management system for replacement of vehicle fluids.

BACKGROUND OF THE INVENTION

Fluid management systems in a vehicle are well known. Fluid management systems can be manual or automatic. Typically, fluid management systems have one conduit connected to an area for used fluids to drain into, and a separate conduit and area for introducing new fluids into the vehicle. As nonlimiting examples, U.S. Pat. Nos. 5,787,372, 6,286,626, 6,508,280, and 7,926,617 each disclose fluid management systems that include separate conduits and separate draining and supplying areas. The entire disclosures of each of the above-mentioned patents are hereby incorporated herein by reference.

The known fluid management systems are inconvenient and difficult for a vehicle owner to use. For example, replacement of vehicle fluids often requires the vehicle owner to drop off the vehicle at a vehicle service center, which can be time consuming and may deter the vehicle owner from changing the vehicle fluids as often as recommended. Known fluid management systems also occupy an unnecessary and inefficient amount of space in vehicles by including separate conduits, and separate draining and supplying areas.

Additionally, typical fluid management systems are not environmentally responsible because the fluid containers and filters are not reusable. Furthermore, conventional fluid containers and filters contain at least a minimal amount of used fluid even after they are emptied.

It is known that, where about thirty (30) separate quart containers of motor oil are allowed to gravity drain, about one (1) quart of motor oil remains uncollected within the containers. It has also been estimated that 3.2 billion quarts of motor oil are used each year, and that 200 million gallons of used motor oil are not properly disposed of after use. Since just one gallon of used oil can contaminate millions of gallons of potable water, improper disposal of used motor oil presents a significant environmental hazard. Known means for collecting used oil and other fluids after removal from a vehicle have been found inadequate and undesirable.

There is a continuing need for a fluid management system that is easy for vehicle owners and technicians to use, spatially efficient, and environmentally friendly.

SUMMARY OF THE INVENTION

In concordance with the instant disclosure, a fluid management system that is easy for vehicle owners and technicians to use, spatially efficient, and environmentally friendly, is surprisingly discovered.

The system of the present disclosure provides an easy to use means for exchanging or replacing fluids in a vehicle. The system does not require additional tools and is environmentally responsible. Where adopted for a variety of different fluids used by the vehicle, a bank of containers having one container for each fluid, in different sizes, colors, and/or shapes, may be provided. Each container can be opened, for example, with a key or by hand by a certified technician or mechanic, or by an owner of the vehicle. A self-contained, used cartridge may then be removed from the container and replaced with a new cartridge. The new cartridge contains a fresh fluid. The new cartridge may also have a filter. Each container may have a fluid level gauge that is easy to read and permits a topping-off of the container, as desired.

Advantageously, the system of the disclosure eliminates a need to raise a vehicle in order to change fluids such as motor oil. Instead, the container is opened, the used cartridge is removed, a new cartridge is inserted. The container is closed, and fluid is caused to flow from the new cartridge to the oil pan of the engine. The system provides the further advantage of minimizing the technician or mechanic's time in change vehicle fluids, and makes vehicle fluid changing easy enough that the owner can change vehicle fluids without the assistance of a mechanic or technician.

The system may include additional features such as temperature regulation systems for cooling or warming the fluid in the container. The system may include sensors in electrical communication with a display, for example, on a dashboard display of the vehicle, which shows information such as the fluid level in the vehicle and miles-to-replace the fluid. A circulation of the fluids may also be initiated at any time by actuation of a pump, in order to militate against dry start-ups of the vehicle. It should also be appreciated that fluid capacities can be easily be changed by the size of the container selected, such that more fluid for a vehicle of a larger size may be used in comparison to the fluid used for a vehicle of a smaller size. In particular examples, such as where the fluid is an engine coolant, the container may also have "locked-out" features that prevent one from opening the container and removing the cartridge until a safe temperature of the fluid has been reached.

Skilled artisans will also understand that the system of the present disclosure permits a superior recycling of vehicles fluids. Each used fluid cartridge can be returned, restocked with fresh fluid, and given a new filter, if desired. The fluid cartridge can thereby be made ready for a next use in the vehicle. Used fluid can be returned to the manufacturer, in the used fluid cartridge, for analysis and/or disposal. By reusing the fluid cartridge of the present disclosure, an undesirable disposal of fluid containers (e.g., oil cans), and filter housings, which invariably contain a minor amount of used fluid even after emptying, can be prevented. Thus, a source of environmental contamination can be mitigated by the present fluid management system and method.

Where the system of the present disclosure is implemented into a manufacturer's lifecycle for the vehicle, the method may include an obtaining of a new fluid cartridge with fresh fluid at a vending machine, for example, at a big box store, an auto parts store, or at a dealership. The vehicle such as a car, a truck, an airplane, a boat, a farm tractor, or a military vehicle, is then parked on a substantially level surface. An engine of the vehicle is turned off, and the fluid permitted to cool, when necessary, to a temperature permitting a safe removal. In the engine compartment, a pump may be turned on in order to move the used fluid, for example, oil, water, transmission fluid, etc., from a fluid reservoir of the vehicle into a removable cartridge. The pump is turned off, and then the used cartridge now containing the used fluid is removed. The used cartridge is then replaced with the fresh cartridge, and the fresh fluid is permitted to flow back into the fluid reservoir, e.g., an engine, a radiator or a transmission. The engine may then be restarted, and the used fluid cartridge can be returned to the vendor, for example, for a refund and proper disposal or recycling.

In one embodiment, a fluid management system for a vehicle includes a removable cartridge. The removable cartridge is configured to hold one of a first fluid and a second fluid. The removable cartridge is in fluid communication with a fluid reservoir via a conduit. A first end of the conduit is in fluid communication with the removable cartridge. A second end of the conduit is in fluid communication with the fluid reservoir. The conduit is also in fluid communication with a fluid exchange pump. The first fluid is selectively transferable from the fluid reservoir through the conduit to the removable cartridge by an actuation of the fluid exchange pump. The second fluid is selectively permitted to flow from the removable cartridge through the conduit to the fluid reservoir.

In another embodiment, a method for managing fluid in a vehicle includes a step of providing a first removable cartridge. The first removable cartridge is placed in fluid communication with a fluid reservoir of the vehicle via a conduit. A first end of the conduit is in fluid communication with the first removable cartridge. A second end of the conduit is in fluid communication with the fluid reservoir. The conduit is also in fluid communication with a fluid exchange pump. The fluid exchange pump is engaged to transfer a first fluid from the fluid reservoir, through the conduit, and into the first removable cartridge. The first removable cartridge is then replaced with a second removable cartridge, the second removable cartridge including a second fluid. The new fluid is then permitted to flow from the second removable cartridge, through the conduit, and into the fluid reservoir.

DRAWINGS

The above, as well as other advantages of the present disclosure, will become readily apparent to those skilled in the art from the following detailed description, particularly when considered in the light of the drawings described hereafter.

FIG. 1 is a schematic view of a fluid management system according to one embodiment of the present disclosure, showing a removable cartridge in fluid communication with an oil pan of a vehicle;

FIG. 2 is a schematic view of the fluid management system illustrated in FIG. 1, and shown without a filter inside the cartridge;

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the present disclosure, application, or uses. In respect of the methods disclosed, the order of the steps presented is exemplary in nature, and thus, is not necessary or critical.

Figure 5:
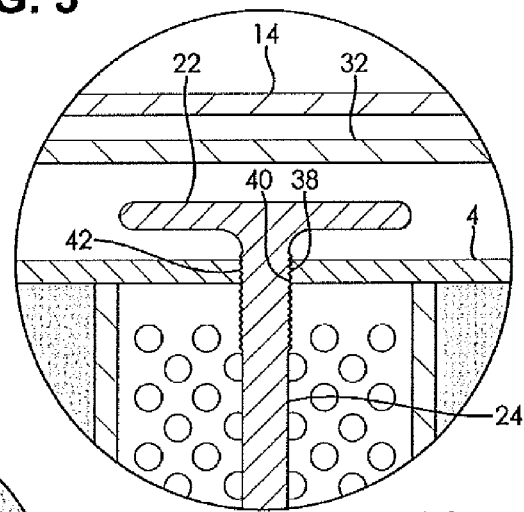
FIG. 5 is an enlarged fragmentary side cross-sectional view of the removable cartridge taken at call out B in FIG. 1, showing a plug handle of the removable cartridge.
Figure 6:
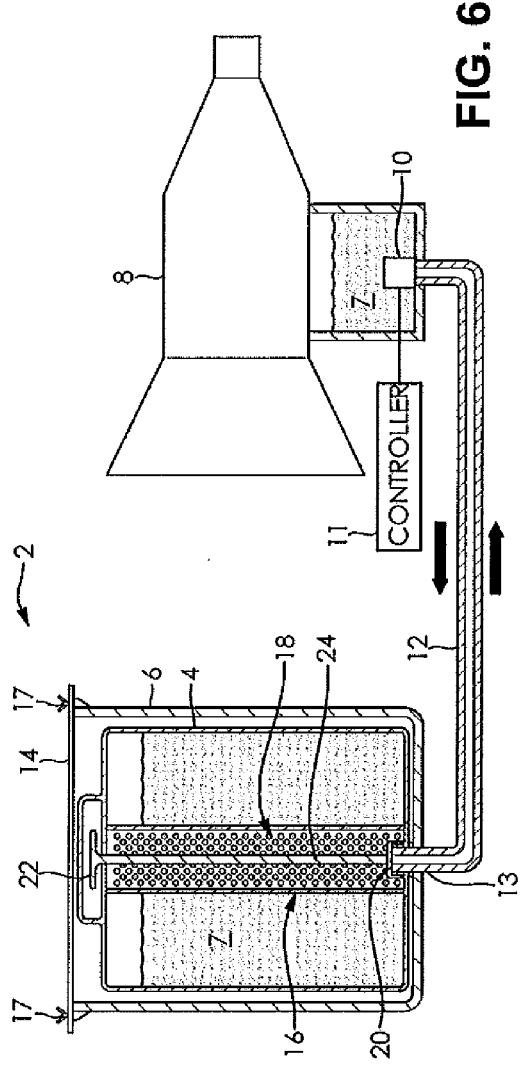
FIG. 6 is a schematic view of a fluid management system according to another embodiment of the present disclosure, shown in fluid communication with a transmission of a vehicle.
Figure 7:
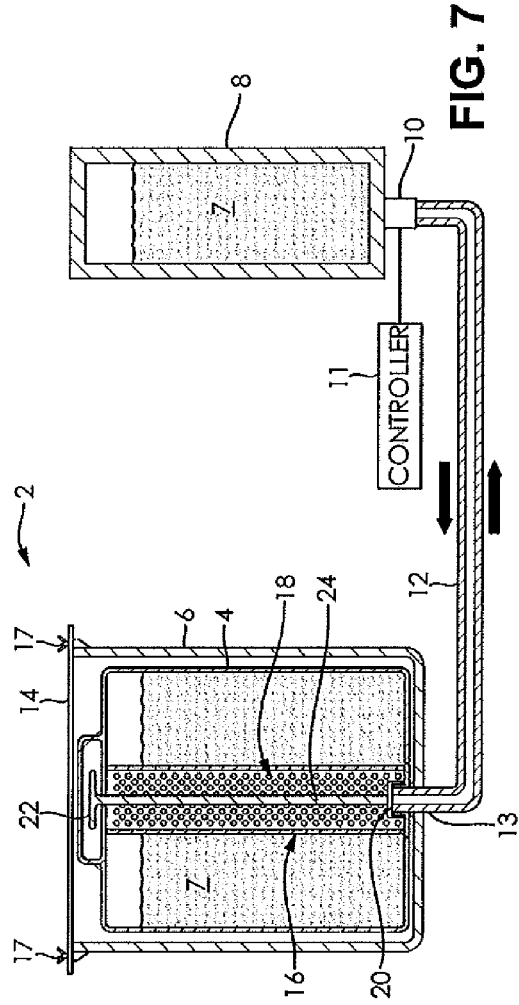
FIG. 7 is a schematic view of a fluid management system according to a further embodiment of the present disclosure, shown in fluid communication with a radiator of a vehicle.
Figure 8:
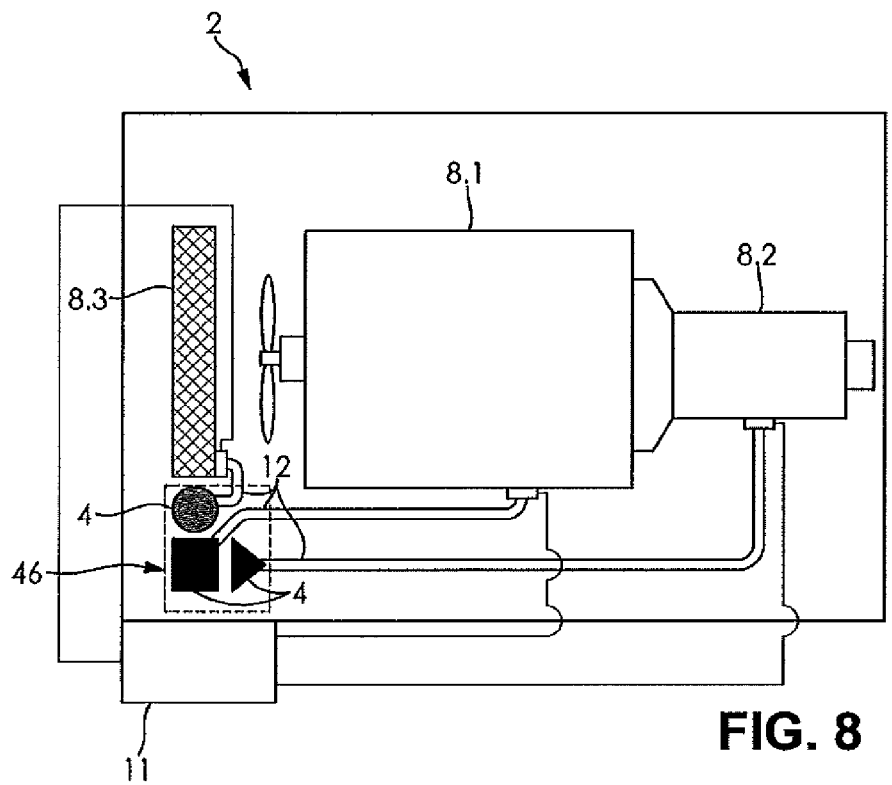
FIG. 8 is a schematic view of a bank of removable cartridges in a vehicle, according to an additional embodiment of the present disclosure.

FIGS. 1-8 illustrate a fluid management system 2 for a vehicle, according to various embodiments of the present disclosure. FIGS. 1-5 show the fluid management system 2 employed with an oil pan of the vehicle. FIG. 6 shows the fluid management system 2 employed with a transmission of the vehicle. FIG. 7 shows the fluid management system 2 employed with a radiator of the vehicle. FIG. 8 shows the vehicle have each of the fluid management system 2 for each of the oil plan, the transmission, and the radiator of the vehicle.

As nonlimiting examples, the fluid management system 2 can be used in vehicles that require a regular fluid change such as a car, truck, airplane, tractor, and boat. These vehicles typically require regular replacement of engine oil, engine coolant, transmission fluid, and the like. The fluid management system 2 may also be used in any machine in which fluids are used. It should be understood that the fluid management system 2 is not limited to the uses of the various embodiment shown, and that other uses for the fluid management system 2 are also within the scope of the present disclosure.

The fluid management system 2 includes at least one removable cartridge 4. The removable cartridge 4 may be disposed in a container 6. The removable cartridge 4 is configured to hold a fluid 7. The fluid 7 may include one of a first fluid, such as a used fluid, and a second fluid, such as a new or fresh fluid for replacement of the used fluid. The conduit 12 may be disposed through a base of the container 6, in order to facilitate a gravity flow of the second fluid from the removable cartridge 4 in the container 6 when replacing the used first fluid 7 with the new second fluid 7.

The fluid management system 2 further includes a fluid reservoir 8, a fluid exchange pump 10, and a conduit 12. The fluid reservoir 8 is typically an engine oil pan or any container capable of housing the fluid 7. The fluid reservoir 8 may be any appropriate shape and size, and may be made from any material capable of withstanding the temperatures associated with operation of the vehicle engine and the turbulence from the moving vehicle. Typically, the fluid reservoir 8 is metal. A lid may be included with the fluid reservoir 8, or the fluid reservoir 8 may be permanently enclosed, as desired.

Although the fluid 7 is shown in FIGS. 1-4 and 6-7 as being in both the removable cartridge 4 and the fluid reservoir 8, it should be understood that the removable cartridge 4 may be empty prior to transferring the used first fluid 7 from the fluid reservoir 8 to the empty removable cartridge 4. Likewise, it should be understood that the removable cartridge 4 may be substantially full prior to transferring the new second fluid 7 form the removable cartridge 4 to the fluid reservoir 8, for purposes of replacing the fluid 7 in the fluid reservoir 8.

The fluid reservoir 8 is typically positioned at an elevation below an elevation of the removable cartridge 4 and the container 6. Placement of the fluid reservoir 8 below the removable cartridge 4 and the container 6 allows the fluid exchange pump 10 to push the used first fluid 7 against gravity and into the empty removable cartridge 4, while the new second fluid 7 from the removable cartridge 4 may pass through the conduit 12 and into the fluid reservoir 8 by means of gravity flow, and without the use of the fluid exchange pump 10.

The fluid exchange pump 10 may sit inside the fluid reservoir 8, be attached at the bottom of the fluid reservoir 8, or be disposed at any other location that allows the fluid exchange pump 10 to pump fluid from the fluid reservoir 8, through the conduit 12. The fluid exchange pump 10 may be capable of pumping fluid in more than one direction. A valve may be included in the fluid exchange pump 10 to prevent fluid from flowing in an undesired direction when the fluid exchange pump 10 is not activated. The valve may be a one-way or check valve, for example. In certain embodiments of the present disclosure, a battery powered fluid exchange pump, or an electrically powered fluid exchange pump may be used. The scope of the present disclosure is not intended to be limited to any particular type of pump.

The fluid exchange pump 10 is in fluid communication with the conduit 12. The fluid exchange pump 10 may be disposed at least partially inside of the fluid reservoir 8 or outside of the fluid reservoir 8, as desired. In particular, the fluid exchange pump 10 may be suitable for pumping the fluid 7 in a first direction toward the removable cartridge 4, while also permitting gravity flow of the fluid 7 in a second direction, different from the first direction, back through the fluid exchange pump 10 and into the reservoir 8. One of ordinary skill in the art may selective suitable types and locations for the fluid exchange pump 10, as desired.

The fluid exchange pump 10 may further be in electrical communication with a controller 11. The controller 11 may include one or more switches, buttons, knobs, dials, or sensors that permit an operator, such as the vehicle owner, technician, or mechanic, to actuate the fluid exchange pump 10. The controller 11 may be in electrical communication with the fluid exchange pump 10 by one of a wired connection and a wireless connection. Actuation of the fluid exchange pump 10 in different directions and at different or variable rates of flow may be facilitated by the controller 11. Other means for allowing the operator to actuate the fluid exchange pump 10 may also be used within the scope of the disclosure.

The conduit 12 provides fluid communication between the at least one removable cartridge 4 and the fluid reservoir 8. For example, the conduit 12 has a first end 13 that is in fluid communication with the removable cartridge 4. The first end 13 may be disposed through the container 6, or may be integral with the container 6, as desired. A second end 15 of the conduit is in fluid communication with the fluid reservoir 8. The second end 15 may be disposed through the fluid reservoir 8, or may be integral with the fluid reservoir 8, as desired. The first fluid is selectively transferrable from the fluid reservoir 8 through the conduit 12 to the removable cartridge 4, for example, by the actuation of the fluid exchange pump 10. The second fluid is selectively permitted to flow from the removable cartridge 4 through the conduit 12 to the reservoir 8.

In certain embodiments, the second fluid is selectively permitted to gravity flow to the fluid reservoir 8. For example, the removable cartridge 4 may be disposed within the vehicle at an elevation greater than an elevation of the fluid reservoir 8, in order to permit the gravity flow of the second fluid from the removable cartridge 4 to the fluid reservoir 8. In another embodiment the second fluid is selectively permitted to flow to the reservoir 8 by the actuation of the fluid exchange pump 10. Other means for transferring the second fluid to the reservoir 8 from the removable cartridge 4 may also be used within the scope of the disclosure.

In one embodiment, the vehicle includes the container 6. The container 6 may be mounted in the vehicle. For example, the container 6 may be disposed in a location readily accessible to the owner of the vehicle, a technician, or a mechanic, for purposes of changing the fluid 7 in the vehicle. The readily accessible location may be in an engine compartment of the vehicle. The container 6 may be permanently or releasably positioned under a hood of the vehicle, for example. The container 6 may also be disposed elsewhere on the vehicle, as desired.

As shown in FIGS. 1-4 and 6-7, the conduit 12 provides fluid communication between the removable cartridge 4 and the fluid reservoir 8. However, the container 6 may also be in fluid communication with the conduit 12 when the removable cartridge 4 is not present. Typically, the conduit 12 is metal, but may include any material capable of directing fluid, withstanding heat from the engine, withstanding turbulence when the vehicle is in motion, withstanding pressure from the fluid exchange pump 10, and generally withstanding the environmental conditions associated with operation of an internal combustion engine in operation. The conduit 12 may be any appropriate size and shape, and may allow fluid to flow in more than one direction. In certain embodiments, the conduit 12 may be used to puncture the removable cartridge 4.

The container 6 is typically made of metal, but may be made from any material capable of withstanding heat produced by an engine, turbulence resulting from the vehicle while in motion, and related environmental conditions associated with an operating internal combustion engine. The container 6 may be any size and shape capable of enclosing or supporting the removable cartridge 4.

A lid 14 may be disposed on the container 6 for securely closing or locking the container 6. As shown in FIGS. 1-2 and 6-7, the lid 14 may be secured to the container 6 within one or more fastening devices 17 such as wing nuts, screws, bolts, clips, and the like. Other means for securely closing or locking the container 6, with the removable cartridge 4 disposed therein, may also be used within the scope of the disclosure.

The at least one removable cartridge 4 is typically made from metal or plastic, but can be made from any substantially fluid-tight, reusable material capable of continued use over time. The removable cartridge 4 may be any size and shape capable of being disposed in whole, or in part, inside the container 6 while the fluid management system 2 is in operation. The removable cartridge 4, container 6, and conduit 12 may cooperate with one another by any appropriate means including, but not limited to, threads, seals, O-rings, and plugs. The color, shape and size of the removable cartridge 4 may indicate the type of fluid that is housed within the removable cartridge 4.

The removable cartridge 4 may also be provided with a filter 16, for example, as shown in FIG. 1. Where used, the filter 16 may be located anywhere in the removable cartridge 4. For example, the filter 16 may clean used oil pumped into the removable cartridge 4 or new oil that flows out of the removable cartridge 4. Where the filter 16 is employed, one or more additional pumps (not shown) may also be used to circulate oil through the filter 16, in operation. The filter 16 may be any appropriate size and shape allowing the filter 16 to be housed in the removable cartridge 4. In a particular embodiment, the filter 16 has a cylindrical porous body filled with a filter medium. The scope of the present disclosure is not intended to be limited to any particular type of filter, and other types of filters 16 may also be used.

Alternatively, and as shown in FIG. 2, the filter 16 may not be present in the fluid management system 2. It should be appreciated that the ease with which the used first fluid 7 may be replaced in the fluid management system 2 may facilitate frequent changes. A need for the filter 16 within the fluid management system 2 of the present disclosure is thereby militated against.

It should be understood that the removable cartridge 4 may need to be removed from packaging prior to use. In other embodiments, the removable container 6 may not require packaging. The packaging or the removable cartridge 4 may require a key for opening, or may be accessible by hand, for example, by pulling of a lid or twisting off a cap of one of the packaging and the removable cartridge 4.

Figure 3:
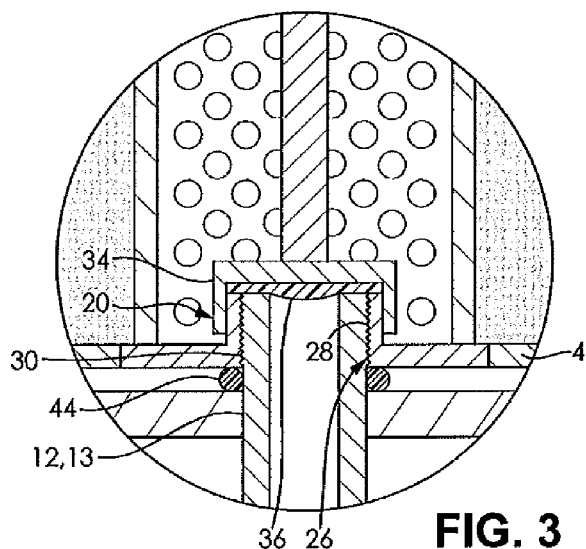
FIG. 3 is an enlarged fragmentary side cross-sectional view of the removable cartridge taken at call out A in FIG. 1, showing a plug in a closed position.
Figure 4:
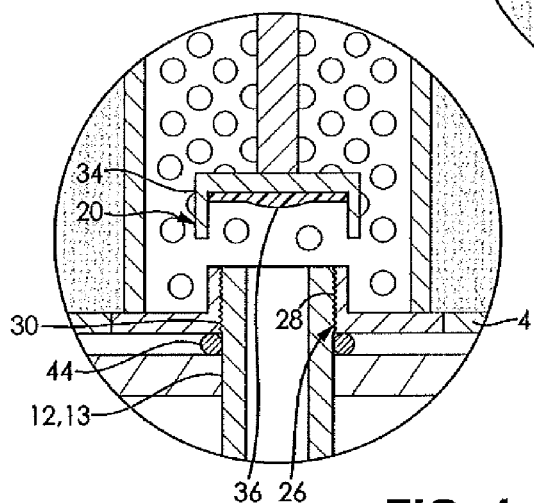
FIG. 4 is an enlarged fragmentary side cross-sectional view of the removable cartridge taken at call out A in FIG. 1, showing a plug in an open position.

Referring now to FIGS. 3-5, the removable cartridge 4 may include a plug assembly 18. The plug assembly 18 is configured to selectively militate against fluid communication between the removable cartridge 4 and the conduit 12. The plug assembly 18 may include a plug 20 coupled to a plug handle 22. An elongate member 24 may be disposed between the plug 20 and the plug handle 22. The plug assembly 18 allows the operator to open the removable cartridge 4 to the conduit 12, and thereby permit the transfer of the fluid 7 to or from the removable cartridge 4 in operation.

In a particular embodiment shown in FIGS. 3 and 4, the plug 20 of the plug assembly 18 is configured to selectively seal the first end 13 of the conduit 12 when the removable cartridge is in fluid communication with the conduit 12. For example, the removable cartridge 4 may have a bottom aperture 26 that is defined by an internal threaded portion 28 of the removable cartridge 4. The first end 13 of the conduit 12 may be disposed through the bottom aperture 26. In particular, the first end 13 of the conduit 12 may have an external threaded portion 30 that cooperates with the internal threaded portion 28 defining the bottom aperture 26 of the removable cartridge 4. In other embodiments, the first end 13 of the conduit 12 may have an internal threaded female portion that cooperates with an external threaded male portion of the removable cartridge 4 to couple the removable cartridge 4 to the conduit 12.

A cartridge handle 32 may be included on the removable cartridge 4 or on the packaging for the removable cartridge 4. The cartridge handle 32 may facilitate a removal or a securing of the removable cartridge 4 to the conduit 12 by the operator. As a nonlimiting example, the cartridge handle 32 may be disposed adjacent the plug handle 22 at a top of the removable cartridge 4. It should be appreciated that the operator may couple the removable cartridge 4 with the conduit 12, for example, by aligning the bottom aperture 26 with the first end 13 of the conduit 12, and manually rotating the removable cartridge 4 using the cartridge handle 32.

In another particular embodiment, the first end 13 of the conduit 12 is not threaded, but instead punctures a membrane seal (not shown). For example, the membrane seal includes a polymeric membrane or a metallic foil that is disposed over the bottom aperture 26 of the removable cartridge, for the purpose of placing the conduit 12 in fluid communication with the removable cartridge 4. Where the membrane seal is used, the first end 13 of the conduit 12 may be tapered in order to facilitate the puncturing of the membrane seal when coupling the removable cartridge 4 with the conduit 12.

Although the use of the cooperating internal and external threaded portions 28, 30, as well as the alternative use of the membrane seal, is described herein, one of ordinary skill in the art may choose other means for selectively coupling the removable cartridge 4 with the conduit 12, as desired.

Further referencing FIGS. 3 and 4, the plug 20 is disposed adjacent a bottom of the removable cartridge 4, above the bottom aperture 26. The plug 20 may include a cup 34. The cup 34 depends from and is coupled to the elongate member 24. In one example, the cup 34 may have a diameter greater than a diameter of the conduit 12, in order to guide the cup 34 to cover the first end 13 of the conduit 12 when the cup 34 is moved axially toward the bottom aperture 26. In another example, the cup 34 has a first polymeric seal 36. The first polymeric seal 36 may be disposed inside of the cup 34. The first polymer seal 36 resiliently deforms to seal the first end 13 of the conduit 12, and militate against fluid flow therethrough, when the cup 34 is moved axially toward the bottom aperture 26 (shown in FIG. 3). Likewise, when the cup 34 is moved axially away from the bottom aperture 26 (shown in FIG. 4), the conduit 12 is unsealed to permit fluid flow therethrough.

Referring now to FIG. 5, the elongate member 24 may be disposed through a top aperture 38 formed in the removable cartridge 4. The plug handle 22 may be coupled to the elongate member 24 outside of the removable cartridge 4, for example. The top aperture 38 may be defined by an internal threaded portion 40 of the removable cartridge 4, and may further cooperate with an external threaded portion 42 of the elongate member 24. Due to the threaded cooperation, it should be appreciated that the axial movement of the plug 20, either toward or away from the bottom aperture 26, may be caused by the manual rotation of the plug handle 22 by the operator. The operator may thereby selectively seal and unseal the removable cartridge 4 from the conduit 12, as desired.

With renewed reference to FIGS. 3 and 4, the fluid management system 2 of the present disclosure may further include a second polymeric seal 44. The second polymeric seal 44 is disposed between the base of the removable cartridge 4 and the bottom of the container 6 when the removable cartridge 4 is placed within the container 6. In particular, the second polymeric seal 44 is disposed around the first end 3 of the conduit 12, and creates a further substantially fluid-tight seal at the bottom of the container 6 when the removable cartridge 4 threadably engages the first end 13 of the conduit 12. As a nonlimiting example, the second polymeric seal 44 is an O-ring. Other types of seals may also be used for the second polymer seal 44, as desired.

As shown in FIG. 8, the fluid management system 2 may be provided in the vehicle having an engine 8.1, a transmission 8.2, and a radiator 8.3, each of which representing the fluid reservoir 8 according to the present disclosure. The fluid management system 2 may therefore include a bank 46 having a plurality of removable cartridges 4. The bank 46 may likewise include a plurality of containers 6 for holding the removable cartridges 4.

The bank 46 of removable cartridges 4 is in fluid communication with each of the engine 8.1, the transmission 8.2, and the radiator 8.3 of the vehicle by a plurality of conduits 12. Each of the engine 8.1, the transmission 8.2, and the radiator 8.3 may have the fluid exchange pump 10 associated therewith, in fluid communication with the conduits 12. The conduits 12 facilitate the selective transfer of used oil, used transmission fluid, and used engine coolant, respectively, to empty ones of the removable cartridges 4 in the bank 46. The operator may select individual ones of the fluid exchange pumps 10 to actuate through use of single or multiple controllers 11 in electrical communication with the fluid exchange pumps 10.

Figure 9:
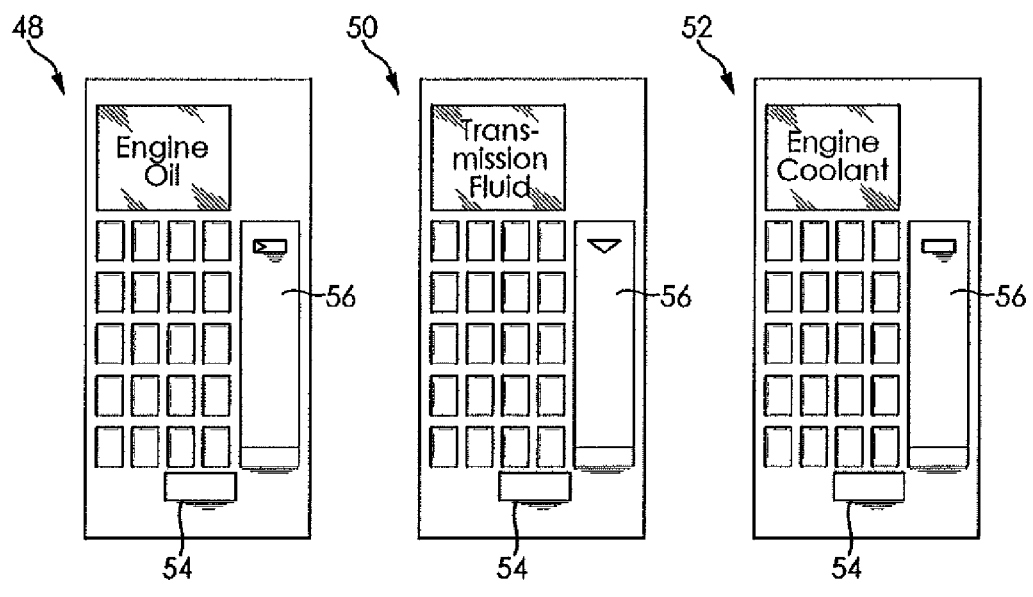
FIG. 9 is a schematic view of a removable cartridge dispensing and exchange station according to an embodiment of the present disclosure.

Referring to FIG. 9, the removable cartridges 4 may be available from a removable cartridge supply station 48, 50, 52. For example, the removable cartridge supply station 48, 50, 52 may permit a retail store or a vehicle service station to provide the removable cartridges 4 for individual sale. The removable supply station 48, 50, 52 may have a dispensing bin 54 through which a new removable cartridge 4 is retrieved upon purchase, and a used cartridge bin 56 into which the removable cartridge 4 having the used fluid 7 after a replacement may be deposited for collection by the provider of the cartridge supply station 48, 50, 52.

The removable cartridge supply station 48, 50, 52 may require a vehicle owner or a service technician to insert payment and/or select a specific removable cartridge 4 containing a desired fluid type. The removable cartridge 4 may be returned to the same, or a different, removable cartridge supply station after use. The supply station 48, 50, 52 may be located at a gas station, service station, grocery store, automobile store, car dealership, or any other location convenient for vehicle owners and service technicians.

One of ordinary skill in the art should understand that extra removable cartridges 4 may also be stored under the hood of the vehicle, as desired.

In operation, the fluid management system 2 reduces a number of removable cartridges 4 that are thrown away and, as such, offers a more environmentally-friendly alternative to prior art systems and methods for changing vehicle fluids. The filter 16, where included in the removable cartridge 4, may also be reusable.

It should be understood that the removable cartridge 4 may be provided empty, for example, prior to the transfer of the used fluid 7 from the fluid reservoir 8, or may include the fluid 7, for example, prior to the transfer of new fluid 7 to the fluid reservoir 8. A temperature of the fluid 7 in the removable cartridge 4 may also be regulated, in order to keep the fluid desirably warm or cool. A gauge (not shown) may be in communication with the removable cartridge 4 to indicate the amount of the fluid 7 in the removable cartridge 4. The removable cartridge 4 may also include instructions (not shown) regarding a distance or an amount of time the vehicle may travel before a next fluid change is recommended.

Advantageously, the fluid management system 2 of the present disclosure allows vehicle owners to change their vehicle fluid without scheduling an appointment or dropping off the vehicle, because the fluid management may be easily performed by the vehicle owner. The fluid management system 2 does not require additional tools, nor does it require that the vehicle be lifted off the ground. Service technicians using the fluid management system 2 also benefit from an improved efficiency in replacing used fluids of the vehicle with new fluids.

The fluid management system 2 is also spatially efficient. Both the empty and full removable cartridges 6 may be placed in a same container 6. This eliminates the additional space necessary in prior art systems, in which separate removable cartridges 6 require separate containers 4. Furthermore, the conduit 12 through which the used fluid 7 is pumped to the empty removable cartridge 4 is the same conduit 12 through which the new fluid 7 flows back into the fluid reservoir 8. Accordingly, skilled artisans should appreciate that the fluid management system 2 does not require different conduits 12 for the transfer of the different used and new fluids 7.

Figure 10:
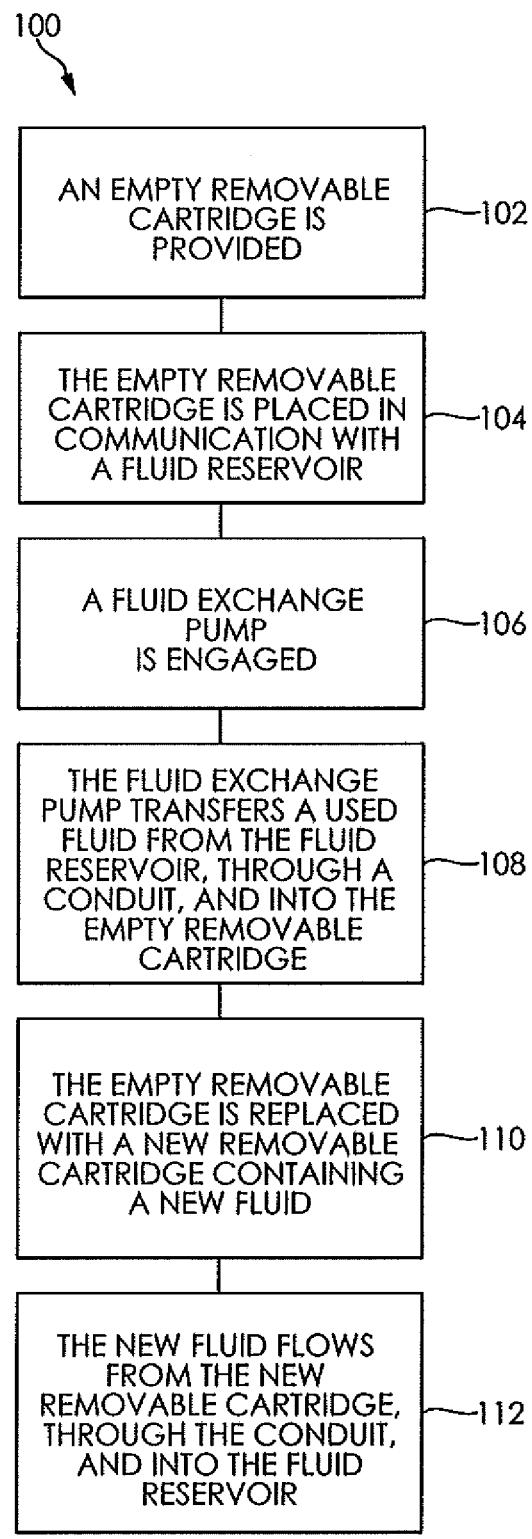
FIG. 10 is a flow diagram of a method for managing fluid in a vehicle according to a further embodiment of the present disclosure.

As shown in FIG. 10, the present disclosure includes a method 100 for managing the fluid 7 of the vehicle. In one method of the disclosure, the vehicle is parked on a level service and the vehicle's engine is turned off. The vehicle and the vehicle's fluids are then permitted to cool, if necessary, prior to replacing the vehicle fluids 7.

In step 102, an empty removable cartridge 4 is provided. The empty removable cartridge 4 may be under the hood of the vehicle after a previous fluid change, or purchased from a removable cartridge supply station 48, 50, 52 as described hereinabove. In step 104, the empty removable cartridge 4 is placed in the container 6. The container 6 may include the lid 14 that must be removed prior to placing the empty removable cartridge 4 inside the container 6. In step 106, the fluid exchange pump 10 in fluid communication with the conduit 12 is engaged. In step 108, the fluid exchange pump 10 transfer the used fluid 7 from the fluid reservoir 8, through the conduit 12, and into the empty removable cartridge 4. The used fluid 7 may pass through the filter 16, where provided in the removable cartridge 4. The fluid exchange pump 10 is disengaged once substantially all of the used fluid 7 has been transferred into the removable cartridge 4.

In step 110, the empty removable cartridge 4 is then removed from the container 6, and the new removable cartridge 4 containing the new fluid 7 is placed in the container 6, thereby replacing the removable cartridge 4 that had been filled with the used fluid 7. The new removable cartridge 4 may be purchased from the removable cartridge supply station 48, 50, 52, as a nonlimiting example. In step 112, the new fluid 7 is permitted to gravity flow from the new removable cartridge 4, through the conduit 12, and into the fluid reservoir 8. The fluid 7 of the vehicle is thereby replaced using the fluid management system 2 of the disclosure.

The new removable cartridge 4 may be removed from the container 6 or left under the hood of the vehicle for future use, as desired. The lid 14 of the container 6 may also be replaced. The vehicle engine may then be turn on to check for fluid leaks, prior to use. The old removable cartridge 4 and the used fluid are then returned to the removable cartridge supply station, where the used fluid may be tested or discarded. The old removable cartridge 4 may be emptied and restocked with new fluid for a future fluid change.

Advantageously, the fluid management system 2 of the present disclosure is simple, and permits vehicle owners and technicians to easily replace the fluid 7 used in most vehicles. The fluid management system is also spatially efficient and environmentally friendly, as established hereinabove.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid management system for a vehicle, comprising:
   a removable cartridge configured to hold one of a first fluid and a second fluid, the removable cartridge in fluid communication with a fluid reservoir via a conduit, a first end of the conduit in fluid communication with the removable cartridge, and a second end of the conduit in fluid communication with the fluid reservoir, the conduit also in fluid communication with a fluid exchange pump, wherein the removable cartridge includes a plug coupled to a plug handle with an elongate member, the plug configured to selectively seal the first end of the conduit when the removable cartridge is in fluid communication with the conduit, wherein the plug is adjacent a bottom of the removable cartridge and the plug handle is adjacent a top of the removable cartridge, and wherein the elongate member is disposed through a top aperture of the removable cartridge, the top aperture defined by an internal threaded portion, the elongate member including an external threaded portion, the internal threaded portion of the removable cartridge cooperating with the external threaded portion of the elongate member to permit an axial movement of the plug when the plug handle is manually rotated, the first fluid selectively transferable from the fluid reservoir through the conduit to the removable cartridge by an actuation of the fluid exchange pump, and the second fluid selectively permitted to flow from the removable cartridge through the conduit to the fluid reservoir.

2. The fluid management system of claim 1, wherein the second fluid is selectively permitted to gravity flow to the fluid reservoir.

3. The fluid management system of claim 1, wherein the second fluid is selectively permitted to flow by the actuation of the fluid exchange pump to the fluid reservoir.

4. The fluid management system of claim 1, wherein the removable cartridge has a bottom aperture defined by an internal threaded portion and the first end of the conduit has an external threaded portion, the internal threaded portion of the removable cartridge cooperating with the external threaded portion of the first end of the conduit to selectively couple the removable cartridge with the conduit.

5. The fluid management system of claim 1, wherein the plug includes a cup having a diameter greater than a diameter of the conduit, a fast polymeric seal disposed inside of the cup, the cup coupled to the elongate member.

6. The fluid management system of claim 1, wherein the removable cartridge further includes a cartridge handle disposed adjacent the plug handle.

7. The fluid management system of claim 1, wherein the removable cartridge is disposed in a container, the first end of the conduit disposed through a base of the container.

8. The fluid management system of claim 7, wherein the container is mounted in the vehicle.

9. The fluid management system of claim 7, further including a second polymeric seal disposed between the removable cartridge and the base of the container, the second polymeric seal disposed around the first end of the conduit.

10. The fluid management system of claim 9, wherein the second polymeric seal is an O-ring.

11. The fluid management system of claim 1, wherein the removable cartridge includes a filter.

12. The fluid management system of claim 1, wherein the fluid reservoir is one of an engine oil pan, a transmission fluid pan, and a radiator.

13. The fluid management system of claim 1, further including a controller in electrical communication with the fluid exchange pump and permitting the selective actuation of the fluid exchange pump.

14. A method for managing fluid in a vehicle, the method comprising the steps of:

providing a first removable cartridge;

placing the first removable cartridge in fluid communication with a fluid reservoir of the vehicle via a conduit, a first end of the conduit in fluid communication with the first removable cartridge, and a second end of the conduit in fluid communication with the fluid reservoir, the conduit also in fluid communication with a fluid exchange pump, wherein the first removable cartridge includes a plug coupled to a plug handle with an elongate member, the plug configured to selectively seal the first end of the conduit when the first removable cartridge is in fluid communication with the conduit, wherein the plug is adjacent a bottom of the first removable cartridge and the plug handle is adjacent a top of the first removable cartridge, and wherein the elongate member is disposed through a top aperture of the first removable cartridge, the top aperture defined by an internal threaded portion, the elongate member including an external threaded portion, the internal threaded portion of the first removable cartridge cooperating with the external threaded portion of the elongate member to permit an axial movement of the plug when the plug handle is manually rotated;

engaging the fluid exchange pump to transfer a first fluid from the fluid reservoir, through the conduit, and into the first removable cartridge;

replacing the first removable cartridge with a second removable cartridge, the second removable cartridge including a second fluid; and permitting the new fluid to flow from the second removable cartridge, through the conduit, and into the fluid reservoir.

15. The method of claim 14, wherein the fluid reservoir is one of an engine oil pan, a transmission fluid pan, and a radiator.

16. The method of claim 14, wherein the first removable cartridge includes a filter for filtering the first fluid during the transfer of the first fluid from the fluid reservoir, through the conduit, and into the first removable cartridge.

17. A fluid management system for a vehicle, comprising:

a removable cartridge configured to hold one of a first fluid and a second fluid, the removable cartridge disposed in a container mounted in the vehicle, the removable cartridge in fluid communication with a fluid reservoir via a conduit, a first end of the conduit in fluid communication with the removable cartridge, the first end of the conduit disposed through a base of the container, and a second end of the conduit in fluid communication with the fluid reservoir, the conduit also in fluid communication with a fluid exchange pump, wherein the removable cartridge has a bottom aperture defined by an internal threaded portion that cooperates with an external threaded portion of the first end of the conduit to selectively couple the removable cartridge with the conduit, wherein the removable cartridge includes a plug coupled to a plug handle with an elongate member, the plug configured to selectively seal the first end of the conduit when the removable cartridge is in fluid communication with the conduit, wherein the plug is adjacent a bottom of the removable cartridge and the plug handle is adjacent a top of the removable cartridge, wherein the elongate member is disposed through a top aperture of the removable cartridge, the top aperture defined by an internal threaded portion, the elongate member including an external threaded portion, the internal threaded portion of the removable cartridge cooperating with the external threaded portion of the elongate member to permit an axial movement of the plug when the plug handle is manually rotated, wherein the plug includes a cup having a diameter greater than a diameter of the conduit, a first polymeric seal disposed inside of the cup, the cup coupled to the elongate member, and wherein a second polymeric seal is disposed between the removable cartridge and the base of the container, the first fluid selectively transferable from the fluid reservoir through the conduit to the removable cartridge by an actuation of the fluid exchange pump, and the second fluid selectively permitted to gravity flow from the removable cartridge through the conduit to the fluid reservoir.

\* \* \* \* \*